No. 842,114.  
PATENTED JAN. 22, 1907.

A. H. POTBURY.  
WRAPPING MACHINE.  
APPLICATION FILED SEPT. 5, 1906.

WITNESSES  
E. M. Callaghan  
C. E. Trainor

INVENTOR  
ALFRED H. POTBURY  
BY Munn & Co.  
ATTORNEYS

No. 842,114. PATENTED JAN. 22, 1907.
A. H. POTBURY.
WRAPPING MACHINE.
APPLICATION FILED SEPT. 5, 1906.

WITNESSES
INVENTOR
ALFRED H. POTBURY
BY
ATTORNEYS

No. 842,114. PATENTED JAN. 22, 1907.
A. H. POTBURY.
WRAPPING MACHINE.
APPLICATION FILED SEPT. 5, 1906.

WITNESSES

INVENTOR
ALFRED H. POTBURY
BY Munn & Co.
ATTORNEYS

No. 842,114. PATENTED JAN. 22, 1907.
A. H. POTBURY.
WRAPPING MACHINE.
APPLICATION FILED SEPT. 5, 1906.

WITNESSES
INVENTOR
ALFRED H. POTBURY
BY
ATTORNEYS

No. 842,114. PATENTED JAN. 22, 1907.
A. H. POTBURY.
WRAPPING MACHINE.
APPLICATION FILED SEPT. 5, 1906.

WITNESSES

INVENTOR
ALFRED H. POTBURY
BY
ATTORNEYS

UNITED STATES PATENT OFFICE.

ALFRED HENRY POTBURY, OF PORTLAND, OREGON, ASSIGNOR TO PACIFIC COAST BISCUIT COMPANY, OF PORTLAND, OREGON, A CORPORATION OF OREGON.

WRAPPING-MACHINE.

No. 842,114.     Specification of Letters Patent.     Patented Jan. 22, 1907.

Application filed September 5, 1906. Serial No. 333,351.

*To all whom it may concern:*

Be it known that I, ALFRED HENRY POTBURY, a citizen of the United States, and a resident of Portland, in the county of Multnomah and State of Oregon, have made certain new and useful Improvements in Wrapping-Machines, of which the following is a specification.

My invention is an improvement in wrapping-machines; and it consists in certain novel constructions and combinations of parts hereinafter described and claimed.

Referring to the drawings forming a part hereof.

In the embodiment of my improvement herein shown and described the mechanism is mounted upon a base-plate A, having a portion thereof at the front removed, as at $a$, the said base-plate being provided upon its under face, on each side of the removed portion, with rails $a^2$ $a^3$, the one rail supported by brackets $a'$, secured to the base, and the other rail $a^3$ supported directly by the base. A plurality of shafts $a^4$ $a^5$ are journaled in the rails at opposite ends thereof, and each shaft has secured thereto a hexagonal wheel $a^6$ $a^7$, while the rear shaft $a^5$ has also secured thereto a ratchet-wheel $a^8$.

A pawl-arm $a^9$ is loosely mounted upon the rear shaft $a^5$ and is provided with a spring-pressed pawl $a^{10}$ for engaging the ratchet-wheel, the pawl-arm being actuated by a link $a^{11}$, connected to one arm of the rock-shaft $a^{12}$, journaled upon a bracket $a^{13}$, rising from the base; and the other arm of the rock-shaft is provided with a roller $a^{14}$, engaging a cam $b$ upon the drive-shaft B, journaled in brackets $a^{15}$, secured to the base and driven by a pulley $b'$, having on its inner side a hand-wheel $b^0$, from any suitable source of power. (Not shown.) A rod $a^{18}$ is secured to the bracket $a^{13}$ and projects forwardly therefrom, the said rod having passed through the free end thereof a pin $a^{17}$, to one of the ends of which is attached a spring $a^{16}$, connected with the lower arm of the rock-lever $a^{12}$, whereby to return the pawl-arm to its original position after its movement by the cam.

A chain C, comprising a plurality of links $c$, having their ends flanged, as at $c'$, and their sides open, is mounted upon the sprocket-wheels $a^6$ $a^7$, the relation of the ratchet-wheel and the hexagonal wheels being such that the movement of the ratchet-wheel the distance of one tooth moves the chain a distance equal to the length of one link. A cross-bar $a^{19}$ is secured to the rails $a^2$ $a^3$ at about the center of the upper run of the chain and is provided with lateral projections $a^{20}$, arranged beneath the chain, whereby to support the upper run thereof in its travel and keep the same in proper alinement.

A segmental track D, equivalent in length to ninety degrees of the circle upon which it is drawn, is secured to the upper face of the base near the inner end of the upper run of the chain, the said track having radial arms extending from each end thereof to a vertical bearing for a bolt $d'$, corresponding in position to the center of the circle upon which the track is formed. A carrier-arm $d^2$ is pivoted upon the bolt $d'$, the said arm being provided with a lug $d^9$, corresponding in length to the width of the track and fitting therein, and adjacent to the bolt $d'$ the arm is provided with a projection $d^3$, connected by a link $d^4$ with one arm of a rock-shaft $d^5$, journaled upon the bracket $a^{13}$, the other arm of the rock-shaft being provided with a roller $d^6$, engaging a cam $b^2$ upon the shaft B, and a spring $d^7$, connected to the pin $a^{17}$ before described, and the lower arm of the rock-shaft is provided for maintaining the roller in contact with the cam. A guide-pad $d^8$ is mounted upon the bolt $d'$ and normally lies with its face $d^{10}$ about halfway across the folding-box E, to be hereinafter described, being retained in this position by a spring $d^x$, connected to a radial arm of the segmental track.

As the caramel is moved toward the folding-box by the carrier it engages the guide-pad $d^8$ upon its forward side and moves the said guide-pad with it until it is directly over the folding-box E, when the plunger descending carries it down upon the paper and out of engagement with the carrier and the guide-pad. The projections $d^y$ $d^z$ on the carrier and the guide-pad, respectively, are designed to engage when no caramel is fed to the machine and push the pad back out of the way of the descending plunger, thus avoiding injury to the moving parts.

It will be understood that during the movement of the chain the carrier-arm $d^2$ lies with the lug $d^9$ on the outer side of the chain in such position that when the chain stops the lug registers with the open end of the link, and at this point the cam $b^2$ operates the rock-shaft to swing the projection of the arm along the segmental track, whereby to move the caramel supported by the link against the face of the guide-pad $d^8$. The carrier-arm $d^2$ is returned to its original position before the chain again moves.

Previous to the before-described movement of the caramel by the carrier-arm a strip of paper is pushed into position in the paper-slot $e^0$ just above the folding-box E, the paper being fed in a continuous strip from a reel H, mounted upon brackets $a^{21}$, secured to the base, the strip passing downwardly from the reel and through a series of tension-rods $h$ $h'$ $h^2$, fastened in the base of the brackets $a^{21}$, the paper passing under the rod $h$, over the rod $h'$, and beneath the rod $h^2$ to a pair of rubber feeding-rolls $h^3$ $h^4$, journaled in bearings in brackets $a^{23}$ secured to the base.

The upper roll $h^3$ of the feeding-rolls is provided with a pinion $h^5$, meshing with a gear-wheel $h^6$ upon a stud $h^7$, projecting from one of the brackets $a^{23}$. The stud $h^7$ has fitting thereon a ratchet-wheel $h^{10}$, secured to the side of the gear-wheel $h^6$ and engaged by a spring-pressed pawl $h^9$ upon a pawl-arm $h^8$, loosely mounted on the stud and connected by a link $h^{13}$ to one of the arms of the rock-lever $h^{14}$, the other arm of the rock-lever being provided with a roller $h^{15}$, contacting with a cam $b^4$ upon the drive-shaft B, the roller being maintained in contact with the cam by means of a spring $h^6$, connected with one of the brackets $a^{21}$ and with the opposite arm of the rock-lever from the roller.

The cutting mechanism comprises a fixed shear-blade secured to the ends of the brackets $a^{23}$ and a movable shear-blade K, pivoted on a projecting stud in a bearing provided in the right-hand bracket $a^{23}$. The cutting mechanism is arranged between the feeding-rolls and the folding-slot, with suitable paper-guides to assure the correct passing of the paper to the paper-slot. The movable blade $k$ has rigid therewith an upwardly-projecting arm $k^2$, connected by a link $k^3$ with one of the arms of a rock-lever $k^4$, the other arm of the rock-lever being provided with a roller $k^5$, contacting with the cam $b^5$ upon the drive-shaft B and normally maintained in contact therewith by mechanism to be later described.

A plunger $e$ is arranged directly above the folding-box within a casing $e'$, the casing being secured to the base in any suitable manner. The upper end of the plunger is provided with a bearing $e^2$, in which is journaled a roller $e^3$, engaged by a cam $b^3$ upon the drive-shaft B, and the bearing is provided with lateral lugs $e^4$, having downwardly-projecting pins $e^5$ for engaging vertical openings in the plunger-casing, and springs $e^6$ encircle the pins between the lugs and the top of the casing, whereby to maintain the roller $e^3$ in contact with the cam.

Figure 8:
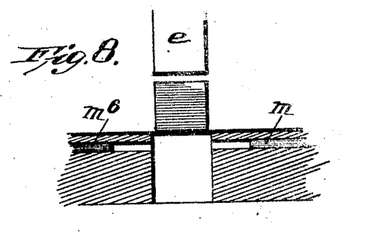
Figs. 8 to 13, inclusive, show the different steps in the folding operation.
Figure 9:
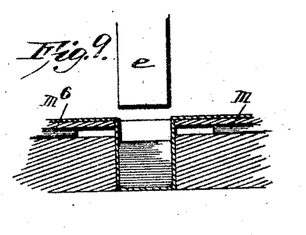
Figure 10:
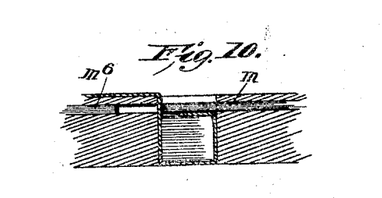
Figure 11:
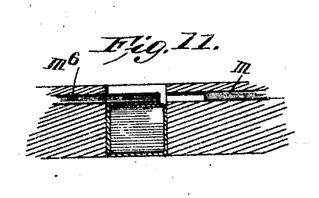
Figures 12, 13, 14:
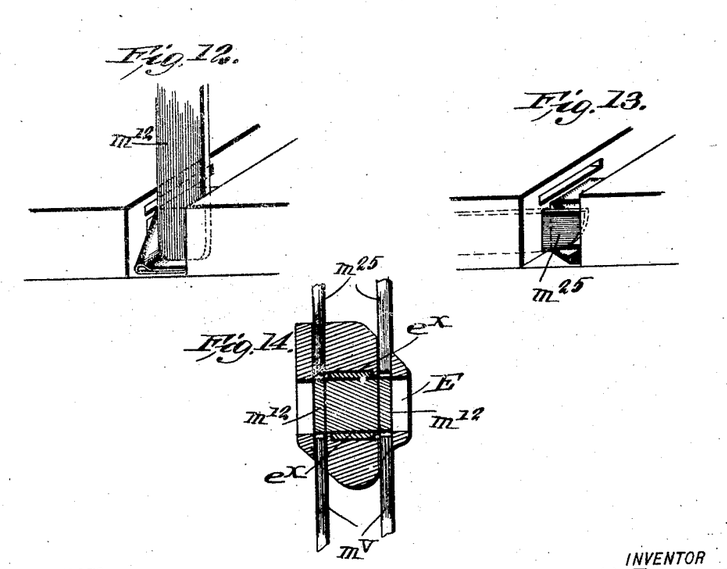
Fig. 14 is a section through the wrapping devices on the line of the folding-box.

After the caramel is moved into position over the folding-box by the carrier-arm, Fig. 8, the plunger moves downward, carrying the caramel and the paper into the box, upturning the sides of the paper, as shown in Fig. 9, thus inclosing the caramel upon three sides. The carrier-arm meanwhile is returned to its original position, and the plunger is again moved upward by the springs $e^6$. The first top-folder $m$ is now moved forward to make the first top fold, the said folder comprising a plate movable through a slot in the folding-box, the outer end of the folder being connected by links $m'$ with one arm of a rock-lever $m^2$, journaled on a pin $m^{32}$, connected with one of the brackets $a^{15}$, the other arm of the rock-lever being provided with a roller $m^3$, contacting with a cam $b^5$ upon the drive-shaft B. The arm of the rock-lever $m^2$ provided with the roller has projecting upwardly therefrom an arm $m^5$, to which is attached a spring $m^4$, connected at its other end with an arm $k^6$, projecting upwardly from the arm of the rock-lever $k^4$ provided with a roller $k^5$, the tension of the spring maintaining both the roller $m^3$ and the roller $k^5$ in contact with the cam.

As the folder $m$ commences its return movement the second top-folder $m^6$ commences its forward movement. The folder $m^6$ likewise consists of a plate moving in a slot through the opposite wall of the folding-box from the folder $m$, the outer end of the folder being connected by links $m^7$ with one of the arms of a rock-lever $m^8$, pivoted on a pin $m^{30}$, projecting from the bracket $a^{15}$ and having journaled in the other arm thereof a roller $m^{28}$, engaging a cam $b^6$ upon the drive-shaft B, the roller being maintained in contact with the cam by means of a spring $m^{29}$, secured at one end to the arm of the rock-lever provided with the roller and at the other end to a stud projecting from the frame $a^{15}$ to be hereinafter described.

A pair of links $m^9$ are connected with that arm of the rock-lever $m^8$ provided with a roller and extend across the machine to a connection with one of the arms of the rock-lever $m^{10}$, journaled on a pin $m^x$, connected with one of the brackets $a^{15}$, the said rock-lever being provided with two forwardly-projecting arms $m^{11}$, pivotally connected by links $m^z$ to the end-folders $m^{12}$, sliding in the plunger-casing on opposite sides of the plunger, the folders being connected to the links by means of pins and the walls of the casing being slotted to permit the vertical movement of the pins.

Before the return movement of the end-folders begins the first corner-folders $m^5$ commence their forward movement, the said corner-folders being also movable through slots in the folding-box and connected at their outer ends by links $m^{15}$ with one of the arms of the rock-lever $m^{16}$, having its other arm provided with a roller $m^{18}$, engaging the cam $b^6$ upon the drive-shaft B, the arm of the rock-lever adjacent to the roller being provided with an upwardly-projecting arm $m^{19}$, connected by a spring $m^{20}$ with another arm $m^{21}$ upon one of the arms of a rock-lever $m^{22}$, journaled upon a pin $m^{23}$, connected with one of the brackets $a^{15}$, the said arm of the rock-lever $m^{22}$ being provided with rollers $m^{17}$, engaging the cam $b^8$. The opposite arm of this rock-lever is connected by links $m^{24}$ with the second corner-folders $m^{25}$ upon the opposite side of the machine from the corner-folders $m^v$. The last folders are similar in all respects to the folders $m^v$ and are also movable through slots in the folding-box.

Figure 1:
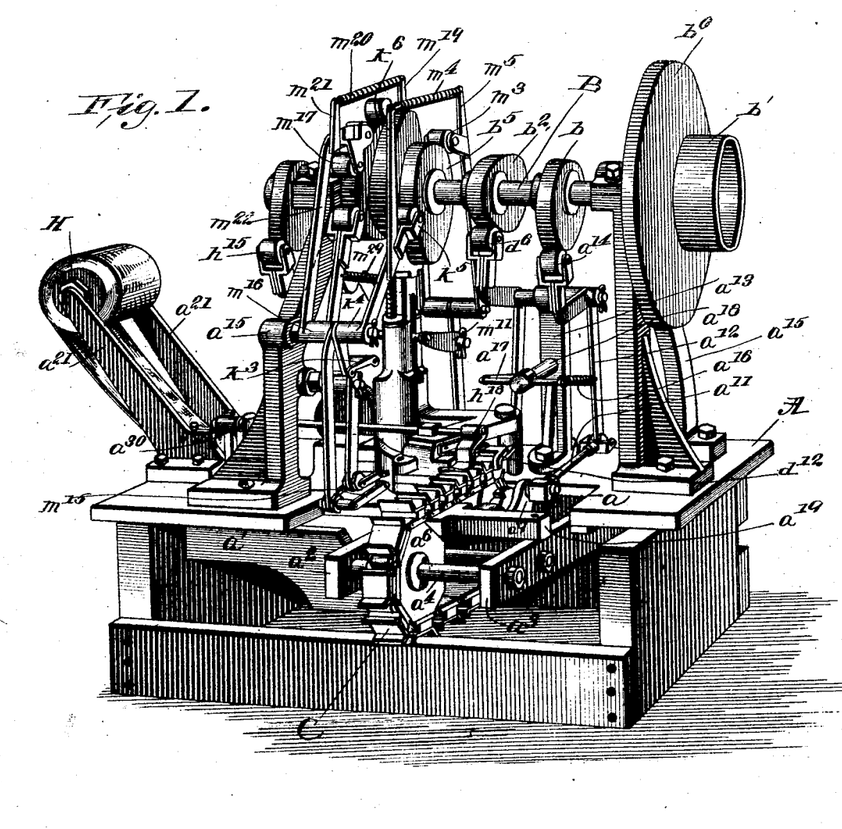
Figure 1 is a perspective view of my improvement from the front.
Figure 2:
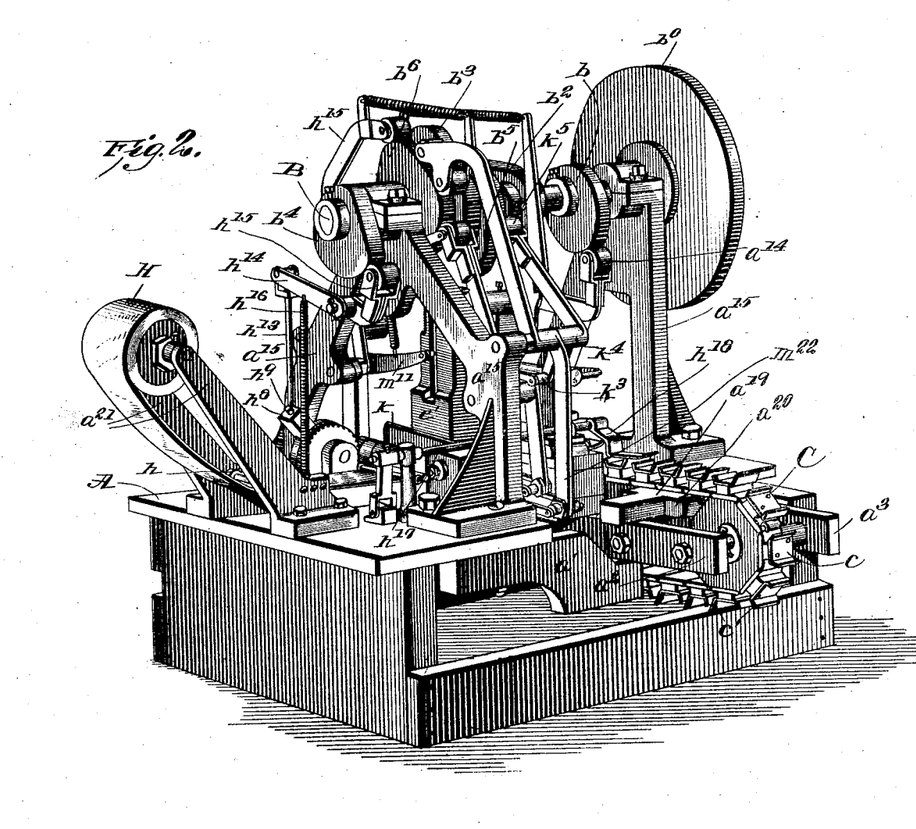
Fig. 2 is a similar view from the left side.
Figure 3:
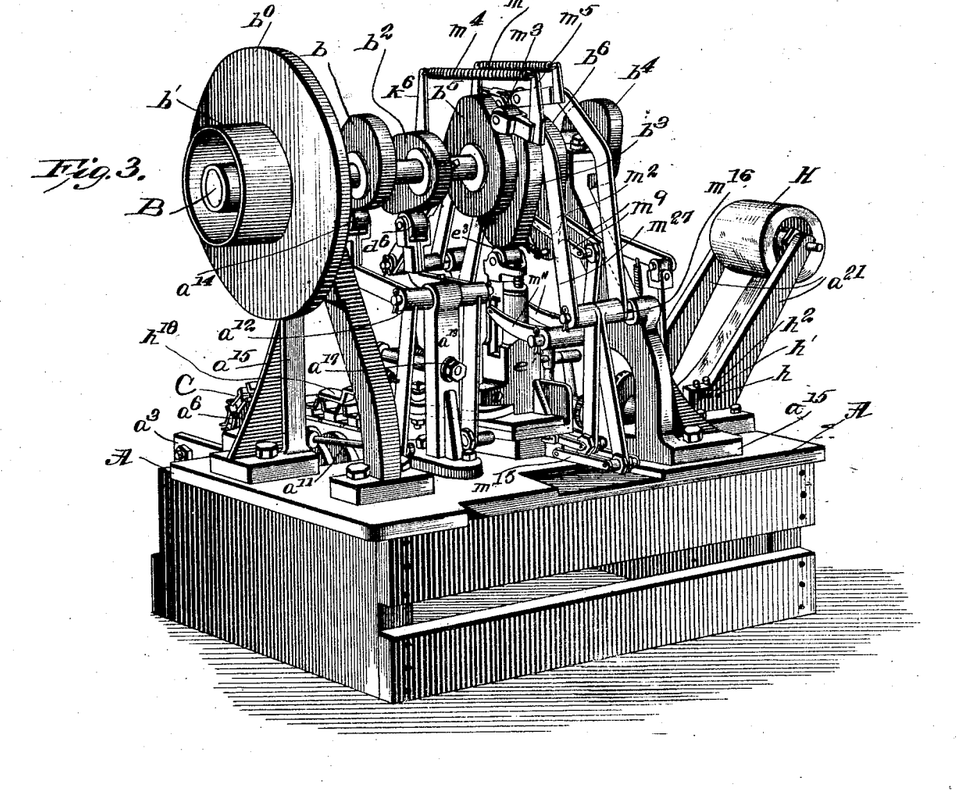
Fig. 3 is a rear perspective view.
Figure 4:
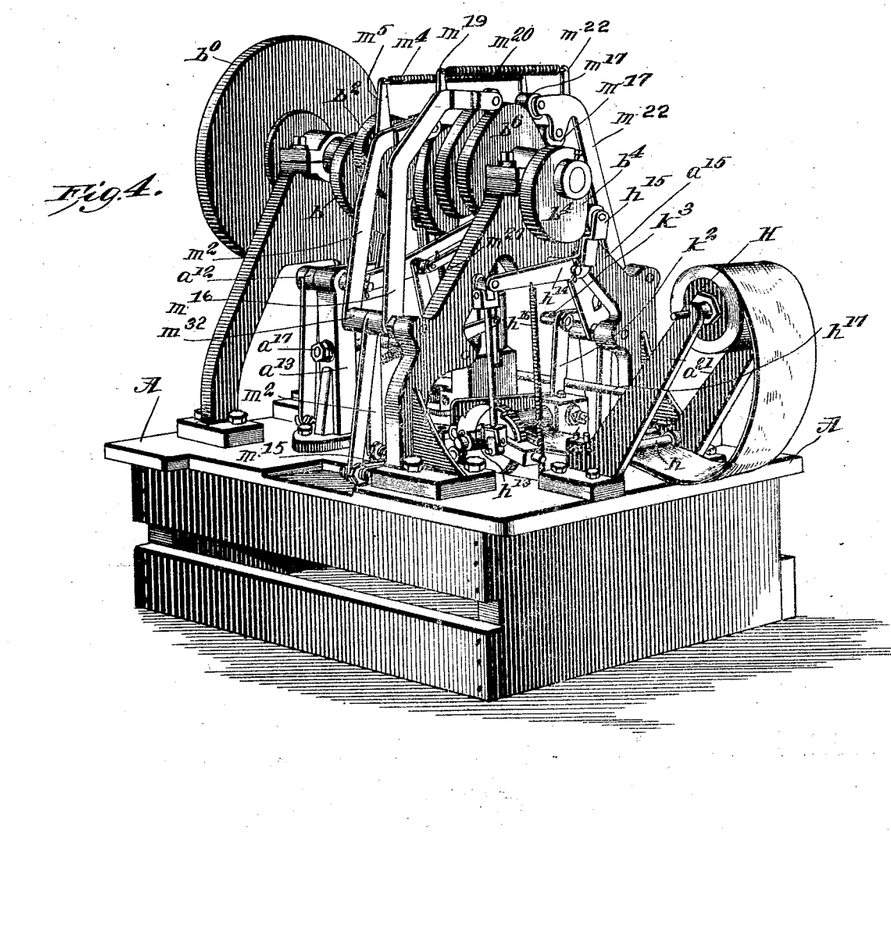
Fig. 4 is a similar view looking from the right and rear.
Figure 5:
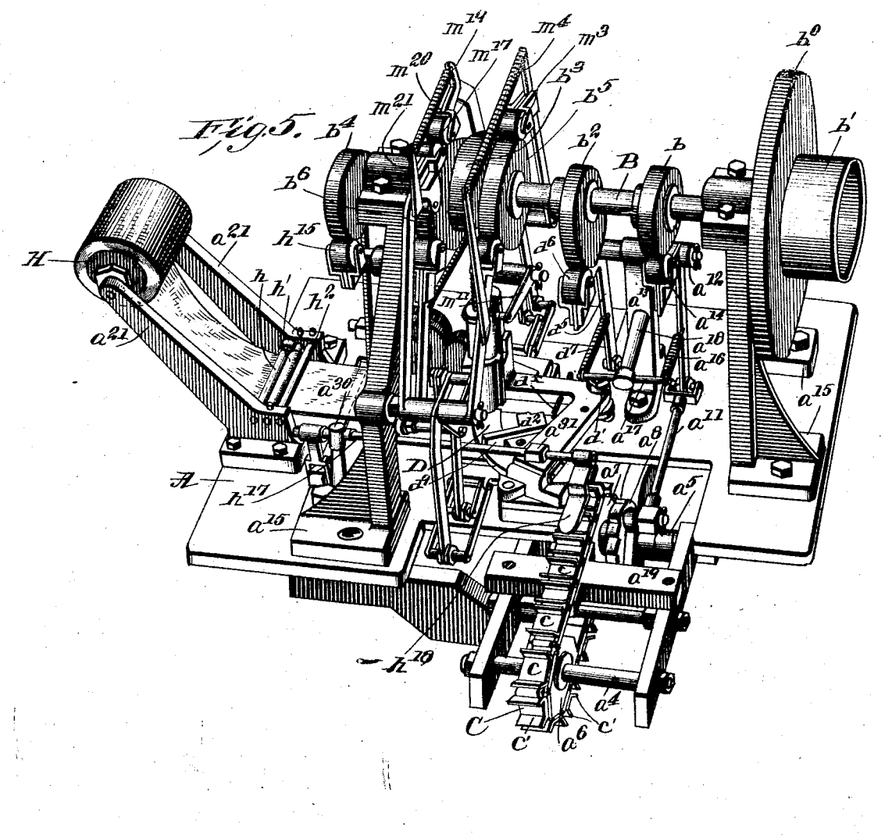
Fig. 5 is a perspective view looking down upon the machine.
Figure 6:
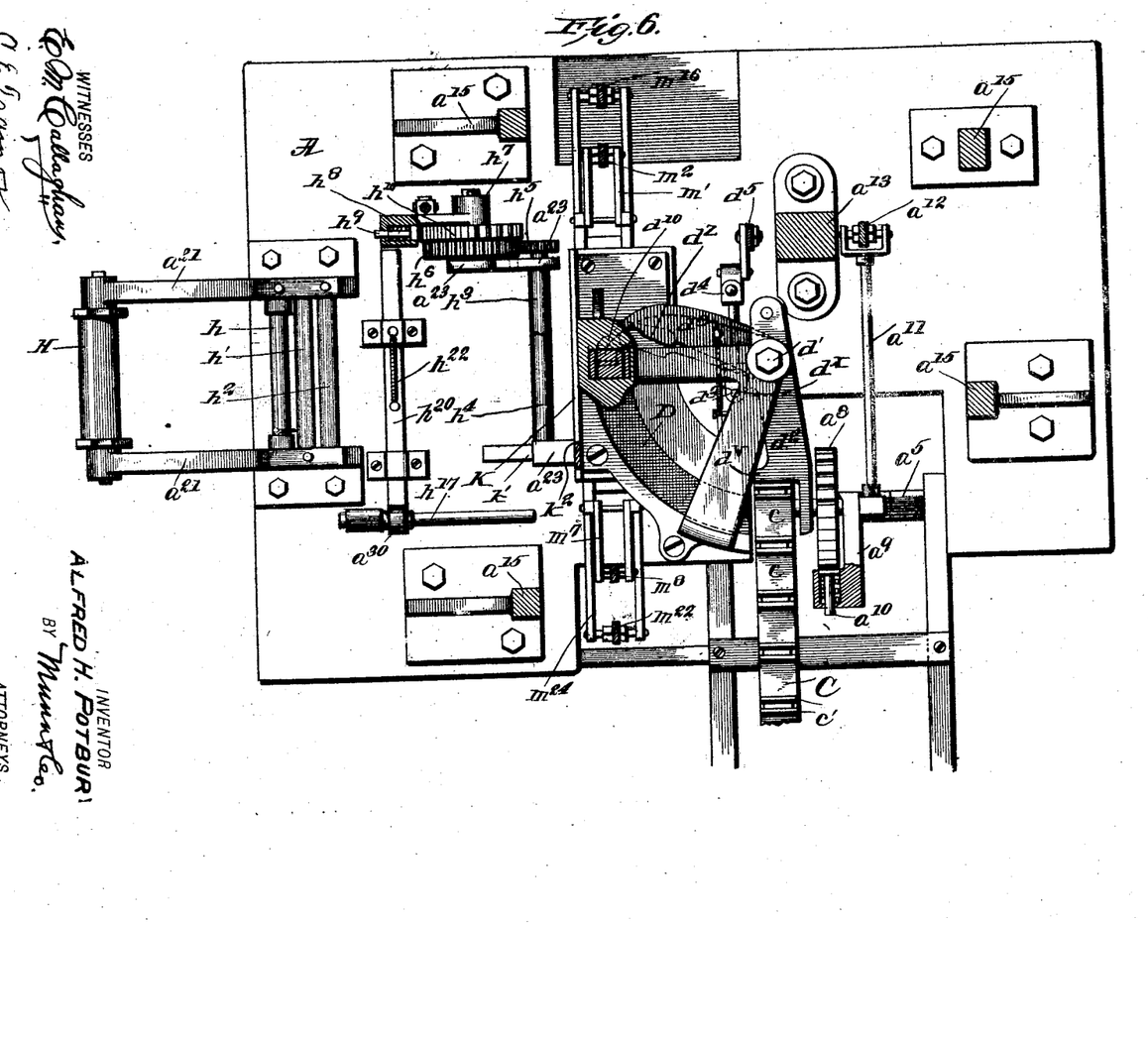
Fig. 6 is a top plan view with the operating-shaft and appertaining parts removed.
Figure 7:
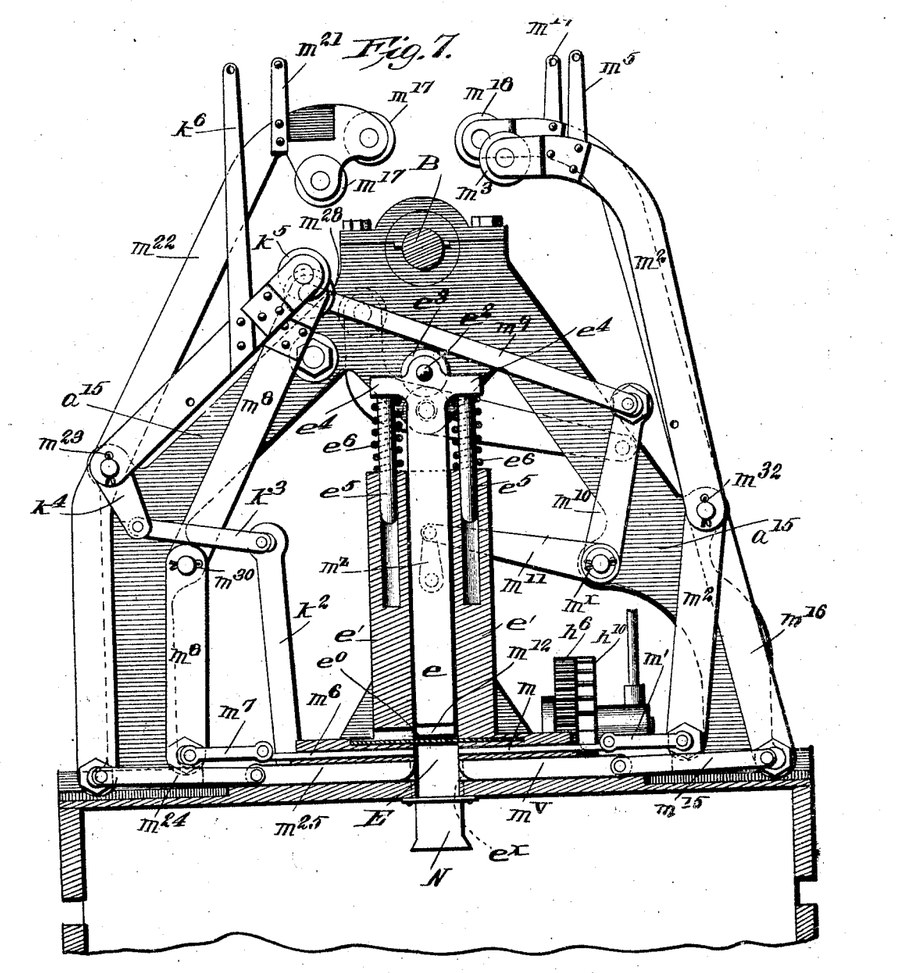
Fig. 7 is a sectional view through the plunger and the folding mechanism.
Figures 15, 16, 17:
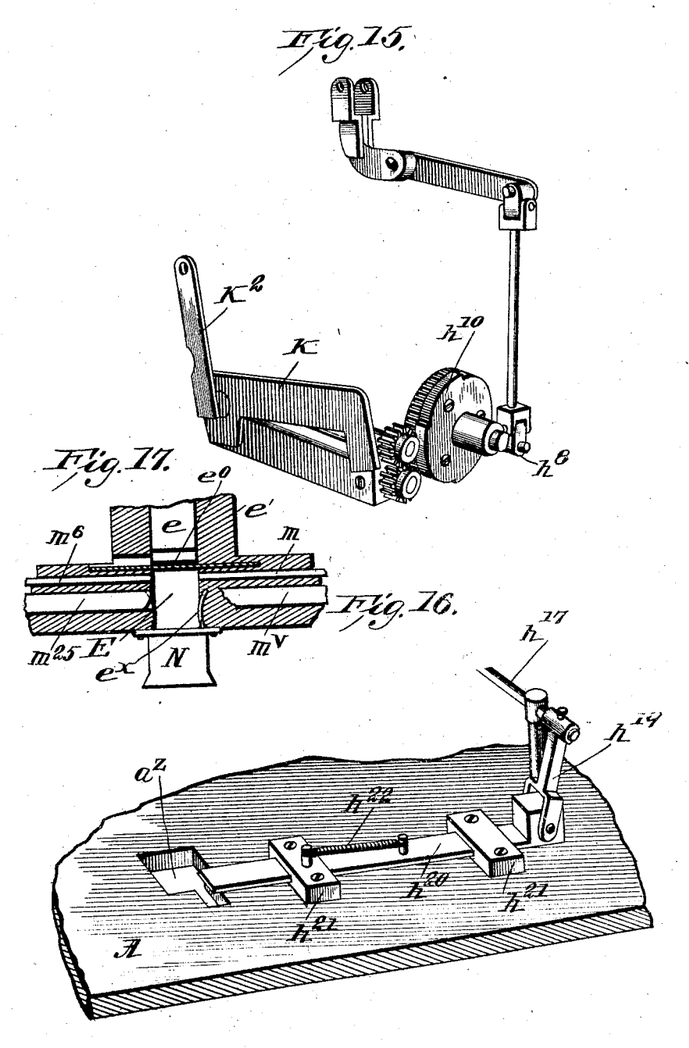
Fig. 15 is a detail of the cutting mechanism and the feed mechanism for the paper-feeding rolls.
Fig. 16 is a detail of the paper-feed stop mechanism.
Fig. 17 is a detail of the folding-box.

In Figs. 5 and 6 is shown an attachment for preventing the feed of the paper when no caramel is in the pocket. This attachment comprises a shaft $h^{17}$, journaled in brackets $a^{30}$ $a^{31}$ upon the base and one of the radial arms of the segmental track, respectively. The said shaft projects above the chain and is provided at that end with a feeler $h^{18}$, the said feeler being adapted to be engaged and raised by the advancing caramel, whereby to rock the shaft in the brackets. The opposite end of the shaft is provided with a link $h^{19}$, rigidly connected therewith, and pivoted to the link is a stop-bar $h^{20}$, slidably mounted in brackets $h^{21}$, secured to the base-plate A and acted upon by a spring $h^{22}$, secured to the stop-plate and to one of the brackets $h^{21}$. The base-plate A is provided with an opening $a^z$ for receiving the pawl-holder $h^8$ in its downward motion. It will be noticed from inspection of Fig. 15 that the ratchet-wheel $h^{10}$ is provided with four teeth, so with each movement of the pawl-holder the feed-roll is advanced ninety degrees. It will be evident from the description that when each of the links of the chain is provided with a caramel the feeler $h^{18}$ will be retained in an elevated position, thus retaining the stop-bar $h^{21}$ retracted out of position to engage the pawl-holder $h^8$ in its downward motion. Should, however, an empty link pass by the feeler, the feeler would drop and the stop-arm $h^{20}$ would be projected beneath the pawl-holder $h^8$ by the spring $h^{22}$, thus preventing a complete movement of the pawl-holder. This complete movement of the pawl-holder is necessary in order to engage a tooth, and when the said complete movement is prevented no feed of the paper will result on the upward motion of the pawl-holder.

In operation, power being applied to the drive-shaft, the caramels are supplied to the links of the chain in any desired manner. Each revolution of the drive-shaft moves the chain one link, stopping the chain each time in such position that one of the links is opposite the carrier-arm and in position to have the caramel removed therefrom. During the movement of the chain the strip of paper is being fed into the paper-slot beneath the plunger by the rubber-covered rolls, and immediately following the carrier-arm swings to sweep the caramel from the link and into position under the plunger, the fall of the caramel (edgwise) into the folding-box being prevented by the guide-pad, which catches the forward side of the caramel and stops it in the proper position for engagement by the plunger. In the meantime the paper beneath the caramal is severed from the strip and the plunger moves the caramel and the paper downward into the folding-box, thus upturning the paper at the sides of the caramel. At this point the plunger is withdrawn and the first side-folder moves forward to lay the upstanding side of the paper upon the caramel. As the first side-folder commences its return movement the second side-folder begins its forward movement, thus laying the opposite upstanding side down upon the first folded side. Through the connection of the second side-folder with the end-folders the movement of the second side-folder and the end-folders is synchronous; but since the end-folders have a greater distance to travel they do not come into operation until the second side-folder has entirely completed its forward movement. Before the end-folders commence their upward movement the first corner-folder is moved forward, folding down the corners upon the ends of the caramel, and as they withdraw the second corner-folders move forward, folding the opposite corners. At this point, a new strip of paper having been fed forward above the caramel already folded, a new caramel is placed thereon and the plunger moves downward, forcing the wrapped caramel into a chute N, forming an extension of the folding-box and passing downward through the base. The movement of the wrapped caramel into the chute makes the final folding, turning the already folded ends up against the ends of the caramel, thus completing the wrapping operation.

The sides of the folding-box E are formed by spring-plates $e^x$, secured to the opening in the base-plate A, through which the caramel passes to the chute N, the said plates possessing sufficient rigidity to retain the caramel and wrapper in proper position in the folding-box.

I claim—

1. A wrapping-machine comprising a base, rails secured to the base and projecting therebeyond, said rails being spaced apart from each other, shafts journaled in the ends of the rails, wheels secured to the shafts, an endless carrier supported on the wheels, said carrier comprising links for supporting the articles to be wrapped, said links having flanged ends and open sides, wrapping devices, a segmental trackway having one of its ends adjacent to the carrier and its other end adjacent to the wrapping devices, an arm pivoted to the base, the pivot of the arm representing the center of the circle upon which the segmental trackway is struck, said arm having a lug moving in the trackway, means for intermittently moving the endless carrier whereby to bring the open sides of the links opposite the end of the trackway, means for swinging said arm upon its pivot, whereby to cause the lug to sweep through the link and the trackway to move the article to the wrapping devices, and a guide-pad adjacent to the wrapping devices for engaging the article to be wrapped and supporting it above the folding-box.

2. A wrapping-machine comprising a base, shafts supported by the base and spaced apart from each other, an endless carrier supported on the shafts and comprising links for supporting the articles to be wrapped, said links having flanged ends and open sides, wrapping devices, a segmental trackway having one end adjacent to the carrier and the other end adjacent to the wrapping devices, an arm pivoted to the base, the pivot of the arm representing the center of the circle upon which the track is formed, means for moving the endless carrier to bring the links in succession opposite the end of the trackway, and means for swinging the arm to move the articles from the links and along the trackway to the wrapping devices.

3. A wrapping-machine comprising a base, wrapping devices supported by the base, an endless carrier comprising a plurality of links having flanged ends and open sides, a segmental trackway supported on the base and having one end adjacent to the carrier and the other end adjacent to the wrapping devices, an arm pivoted to the base, the pivot of the arm representing the center of the circle upon which the track is formed, means for intermittently moving the endless carrier to place the links in succession opposite the end of the trackway, and means for swinging the arm whereby to move the articles from the links and along the trackway to the wrapping devices.

4. A wrapping-machine comprising a base, wrapping devices supported on the base, an endless carrier comprising a plurality of links for receiving the articles to be wrapped, a segmental trackway having one end adjacent to the carrier and the other end adjacent to the wrapping devices, an arm pivoted to the base, the pivot of the arm representing the center of the circle upon which the track is formed, means for intermittently moving the carrier to bring the links in succession opposite the end of the trackway, and means for swinging the arm whereby to move the articles from the links and along the trackway to the wrapping devices.

5. A wrapping-machine comprising a base, wrapping devices supported on the base, an endless carrier comprising a plurality of links for supporting the articles to be wrapped, a segmental trackway having one end adjacent to the carrier and the other end adjacent to the wrapping devices, means for intermittently moving the endless carrier to bring the links in succession opposite the end of the trackway, and means for moving the articles from the links and along the trackway to the wrapping devices.

6. In a wrapping-machine, wrapping devices, an endless carrier comprising a plurality of links for supporting the articles to be wrapped, a segmental trackway having one end adjacent to the carrier and the other end adjacent to the wrapping devices, an arm pivoted to the base, the pivot of the arm representing the center of the circle upon which the track is formed, means for intermittently moving the endless carrier to bring the links in succession opposite the end of the trackway, and means for swinging the arm whereby to move the articles from the links along the trackway to the wrapping devices.

7. A wrapping-machine comprising a base, an endless carrier comprising links for supporting the articles to be wrapped, said links having flanged ends and open sides, wrapping devices, a trackway having one of its ends adjacent to the endless carrier and the other adjacent to the wrapping devices, and means for moving the articles from the links along the trackway to the wrapping devices.

8. In a wrapping-machine, wrapping devices, an endless carrier comprising a plurality of links for supporting the articles to be wrapped, a trackway leading from the carrier to the wrapping devices, means for intermittently moving the carrier whereby to bring the links in succession opposite the end of the trackway, and means for moving the articles from the links along the trackway to the wrapping devices.

9. A wrapping-machine comprising a base having an opening therethrough, a folding-box having open ends above the opening, a casing supported above the folding-box, means for placing a strip of paper over the folding-box, means for placing an article to be wrapped on the paper, a plunger movable in the casing, means for moving the plunger to force the article into the folding-box whereby to fold the paper up against the sides of said article, means for folding the sides of the paper down upon the article, end-folders movable along the sides of the plunger, means for operating said end-folders, corner-folders, means for operating said corner-folders, and a chute through which the article is forced by the succeeding movement of the plunger, whereby to complete the folding operation.

10. A wrapping-machine comprising a base having an opening therethrough, a folding-box having open ends above the opening, means for placing a strip of paper over the folding-box, means for placing an article on the paper, a plunger, means for moving the plunger to force the article into the folding-box, means for folding the paper over the article, end-folders movable alongside the plunger for folding the ends of the paper, corner-folders, and means for operating the same, and a chute through which the article is forced by the succeeding movement of the plunger, whereby to complete the folding operation.

11. In a wrapping-machine, a folding-box, means for placing a strip of paper over the folding-box, means for placing an article on the paper, a plunger, means for moving the plunger whereby to force the article and the paper into the folding-box, a side-folder for folding one of the upstanding sides of the wrapper down upon the article, a second side-folder for folding the second side down upon the article, end-folders, corner-folders, means for operating said folders, a connection between the end-folders and the second side-folder for operating said end-folders at the completion of the forward movement of said side-folders, and a chute leading from the folding-box through which the article is forced by the succeeding movement of the plunger.

12. In a wrapping-machine, a folding-box, means for placing a strip of paper over the folding-box, means for placing an article to be wrapped on the paper, a plunger, means for moving the plunger whereby to force the article to be wrapped and the wrapper into the folding-box, a side-folder for folding one of the upstanding sides of the wrapper down upon the article, a second side-folder for folding the other upstanding side, end-folders, means for operating the side-folders in sequence, means for operating the end-folders before the return movement of the second side-folder, corner-folders, and a chute leading from the folding-box through which the article is forced by the succeeding movement of the plunger.

13. In a wrapping-machine, wrapping devices comprising side-folders, and end-folders, means for moving one of said side-folders over the article to be wrapped, means for moving the second side-folder over the article to be wrapped, and a connection between the end-folders and the second side-folders whereby to operate said end-folders at the completion of the forward movement of the second side-folder.

14. In a wrapping-machine and in combination, wrapping devices, an endless carrier for supplying articles to the wrapping devices, means for feeding a strip of paper to the wrapping devices, comprising feed-rolls engaging the strip, a ratchet-wheel connected with one of the rolls, a pawl for moving the ratchet-wheel, a normally active stop-arm for restraining the movement of the pawl, a feeler connected with the stop-arm, and adapted to be engaged by the articles on the carrier whereby to restrain the operation of the stop-arm.

15. In a wrapping-machine and in combination, a folding-box having wrapping devices in connection therewith, an endless carrier comprising a plurality of links, a segmental track having one end adjacent to the carrier, and the other end adjacent to the folding-box, an arm pivoted to the machine, the pivot of the arm representing the center of the circle upon which the track is formed, means for moving the endless carrier to place the links in succession opposite the end of the track, means for swinging the arm to move the articles from the links and along the track to the folding-box, and a yielding guide-pad for engaging the article to be wrapped, said pad normally resting partially over the folding-box and adapted to be moved from thereover by the article.

16. In a wrapping-machine and in combination, a folding-box having wrapping devices in connection therewith, an endless carrier comprising a plurality of links, a segmental track having one end adjacent to the carrier, and the other end adjacent to the folding-box, an arm pivoted to the machine, the pivot of the arm representing the center of the circle upon which the track is formed, means for moving the endless carrier to place the links in succession opposite the end of the track, means for swinging the arm to move the articles from the links and along the track to the folding-box, a yielding guide-pad for engaging the article to be wrapped, said pad normally resting partially over the folding-box and adapted to be moved from thereover by the article, and means in connection with the carrier and the pad for moving said pad from over the folding-box in the absence of an article on the carrier.

17. In a wrapping-machine, and in combination, wrapping devices, means for feeding a strip of paper to the wrapping devices, comprising feed-rolls engaging the strip, means for intermittently actuating the rolls, means for restraining said actuating means, an endless carrier for supplying articles to be wrapped to the wrapping devices, and means controlled by the presence of an article on the carrier for preventing the operation of the said restraining means.

18. In a wrapping-machine and in combination, wrapping devices, means for intermittently feeding a strip of paper to the wrapping devices, normally operative means for restraining the feeding means, an endless carrier for supplying articles to be wrapped to the wrapping devices, and means controlled by the presence of an article on the carrier for preventing the operation of said restraining means.

19. A wrapping-machine having an intermittently-operating paper-feed device, restraining means for the paper-feed, a carrier for supplying articles to be wrapped, and means controlled by the presence of an article upon the carrier for preventing the operation of the said restraining means.

ALFRED HENRY POTBURY.

Witnesses:
J. L. WICKERSHAM.
M. F. MOORE.